United States Patent [19]
King et al.

[11] Patent Number: 6,057,399
[45] Date of Patent: May 2, 2000

[54] ISOCYANATE-DERIVED PHASE CHANGE INK ADDITIVE FOR IMPROVED ELECTRONIC LEVEL SENSING RELIABILITY AND TYPE ENCODING

[75] Inventors: Clifford R. King, Salem; C. Wayne Jaeger, Beaverton; Donald R. Titterington, Tualatin, all of Oreg.

[73] Assignee: Xerox Corporation, Stamford, Conn.

[21] Appl. No.: 09/148,726

[22] Filed: Sep. 4, 1998

Related U.S. Application Data

[63] Continuation-in-part of application No. 08/672,815, Jun. 28, 1996, Pat. No. 5,830,942.
[51] Int. Cl.$^7$ .............................. C08J 3/00; C08K 3/20; C08L 75/00; C09D 11/12; C03C 17/00
[52] U.S. Cl. ............... 524/590; 106/31.01; 106/31.13; 106/31.27; 106/31.29; 106/31.3; 106/31.32; 106/31.43; 523/160; 523/161; 524/589
[58] Field of Search ..................... 523/161, 160; 524/590, 589; 106/31.01, 31.13, 31.27, 31.29, 31.3, 31.32, 31.43

[56] References Cited

U.S. PATENT DOCUMENTS

| | | | |
|---|---|---|---|
| 5,385,957 | 1/1995 | Tobias et al. | 523/161 |
| 5,386,224 | 1/1995 | Deur et al. | 347/7 |
| 5,621,022 | 4/1997 | Jaeger et al. | 523/161 |
| 5,780,528 | 7/1998 | Titterinton et al. | 523/161 |

OTHER PUBLICATIONS

U.S. Patent Application, Serial No. 08/916,588, C.W. Jaeger et al.

U.S. Patent Application, Serial No. 09/023,851, D.R. Hahn et al.

*Primary Examiner*—Patrick D. Niland
*Attorney, Agent, or Firm*—Francis I. Gray; Ralph D'Alessandro

[57] ABSTRACT

Phase change ink additives are disclosed which comprise quaternary ammonium salts that are extremely useful in producing phase change inks with increased specific conductance. Suitable and adjustable specific conductance is necessary for reliable functioning of electronic type ink level sensing systems used in phase change ink jet printers. Phase change inks may also be encoded for type by virtue of their specific conductance.

41 Claims, No Drawings

ISOCYANATE-DERIVED PHASE CHANGE INK ADDITIVE FOR IMPROVED ELECTRONIC LEVEL SENSING RELIABILITY AND TYPE ENCODING

This application is a continuation-in-part application of U.S. patent application Ser. No. 08/672,815 filed Jun. 28, 1996 now U.S. Pat. No. 5,830,942 and assigned to the assignee of the present invention.

BACKGROUND OF THE INVENTION

This invention relates generally to phase change inks and more particularly to additives and the use of additive modified phase change inks in electronic level sensing systems and to the use of additives to encode phase change ink type into the ink composition.

In general, phase change inks are solid at room temperature but exist in the liquid phase at the elevated temperature of an ink jet printer device. At the liquid phase operating temperature droplets of liquid ink are ejected from the printing device. The ink droplets quickly solidify upon contact with the surface of a wide variety of printing media, to form a predetermined pattern of solidified ink drops.

Phase change ink is desirable since it remains in a solid phase at room temperature, during shipping, and during long term storage. Also, the problems associated with nozzle clogging due to ink evaporation are essentially eliminated with phase change ink, thereby improving the reliability of ink jet printing. Furthermore, since the ink droplets solidify immediately upon contact with the substrate, migration of the ink along the printing medium is prevented and dot quality is improved.

One of the disadvantages of phase change ink is that it takes time to heat the solid ink to the melting point and then to the higher ink jet operating temperature. U.S. Pat. No. 5,386,224 to Deur et. al. for "Level Sensing Probe System for an Ink Jet Printer" dealt with this problem in an ink level sensing system for an ink jet printer by incorporating the volume of melted ink in the reservoir into an electrical circuit where the volume of melted ink acts as a variable resistor. In this level sensing system high conductance (low resistance) corresponds to a reservoir filled with ink and low conductance (high resistance) corresponds to a reservoir half or less filled with ink. By monitoring the system's conductance, a low ink level can be detected, and the operator alerted, before the reservoir runs dry. If the reservoir does become empty the print head will require re-priming in addition to refilling with an additional loss of operational time and consumption of ink by purging. Difficulties are encountered using this level sensing circuit with many of the embodiments of phase change ink because the materials suitable for phase change ink are natural and synthetic waxes and various resins that are used in order to obtain the desired transparency, melting point, microcrystallinity and durability of the inks. A characteristic of this class of materials is that they are nonpolar and, as such, do not solvate ions very well, if at all. This microscopic characteristic of the molecules is manifested in the bulk material as low specific conductance, or in other words, they are electrical insulators. The aforementioned level sensing circuit works because of metal ions or amine complexes which are present in a very low level in the inks.

The use of polymeric colorants in phase change inks present another problem because the trace of specific conductance contributed by impurities is often too small to be interpreted correctly by the electronics. This could result in the operator continuing to be prompted to add ink despite the reservoir already being filled with ink. Eventually the reservoir overflows and the print head and/or the printer is ruined.

These problems are solved by the present invention by providing a means of adjusting upwardly the specific conductance of phase change ink by means of a very small concentration of a specific conductance additive.

SUMMARY OF THE INVENTION

It is an aspect of the present invention to provide a reliable level sensing system for use in a phase change ink jet printer.

It is another aspect of the present invention that the composition of an isocyanate-derived phase change ink composition is modified to include a very small amount of a specific conductance augmenting additive.

It is still another aspect of the present invention that a way of encoding information about ink type in the phase change ink composition is obtained by varying the level of specific conductance additive introduced into the ink formulation.

It is a feature of the present invention that the modified phase change ink compositions of the present invention comprise admixtures of isocyanate-derived phase change ink compositions and quaternary ammonium salts.

It is another feature of the present invention that modifying phase change ink by adding larger amounts of the specific conductance augmenting additive creates distinctive levels of specific conductance in the phase change ink which may be used advantageously.

It is an advantage of the present invention that quaternary ammonium salts provide increased specific conductance to the functionality of the isocyanate-derived ink when used in a level sensing system.

It is another advantage of the present invention that increased functionality in a level sensing system of the isocyanate-derived ink is obtained by a desired amount of the specific conductance augmenting additive.

It is still another advantage of the present invention that the addition of larger amounts of the specific conductance augmenting additive permits the color or family type of phase change ink to be encoded into the isocyanate-derived phase change ink composition during the routine ink manufacturing process.

These and other aspects, features and advantages are obtained by the addition of a relatively small amount of a specific conductance augmenting additive, such as quaternary ammonium salts, which provide an enhanced ink level sensing system for use in phase change ink printers using isocyanate-derived phase change ink and in larger quantities will permit the isocyanate-derived phase change ink to be encoded by color or family or composition type.

DETAILED DESCRIPTION OF THE PREFERRED EMBODIMENTS

This invention is directed to phase change ink specific conductance augmenting additives useful in producing phase change inks whose level in an ink jet print head may be reliably interpreted. This invention is further directed to the use of phase change ink specific conductance augmenting additives to encode ink type by virtue of creating different levels of specific conductances in different types of ink.

The conductance augmenting additive of this invention comprises at least one nitrogen containing compound. The specific conductance augmenting additive of this invention comprises the family of quaternary ammonium salts, either used individually or in blends thereof. This family includes benzyl-, phenyl-, alkyl-, and alkyleneoxy- substituents in the cation. Akzo Nobel Chemicals Inc. of Chicago, Ill. is a commercial source for such materials which are available under the following general classes of compounds: alkyltrimethyl, dialkyldimethyl, trialkylmethyl, benzylalkyl, ethoxylated, and propoxylated quaternary salts, and quaternary diammonium salts. Preferably the quaternary ammonium salt is a tetra-alkyl salt having about 4 to about 50 carbon atoms and most preferably contains 14 to 18 carbon atoms. The gegen ion is preferably a chloride, fluoride, bromide, iodide, hydroxide, tribromide, nitrate, carboxylates (including but not limited to acetate, benzoate and stearate), tetrafluoroborate, toluene sulfonate, trifluoromethylsulfonate, methyl sulfate or sulfate. Most preferably the gegen ion is tetrafluoroborate. Tetrabutylammonium tetrafluoroborate is the preferred additive. Tetradecyltrimethylammonium bromide is also suitable, but can induce a color shift. Another additive employable in an effective amount is benzyltriethylammonium chloride.

The subject phase change ink carrier composition typically comprises a fatty amide containing material. The fatty amide containing material of the present invention preferably comprises a tetra-amide compound. The preferred tetra-amide compounds for producing the phase change ink carrier composition are dimer acid based tetra-amides which preferably include the reaction product of a fatty acid, a diamine (ethylene diamine) and a dimer acid. For the purposes of this invention the term dimer acid preferably means a hydrogenated oleic acid dimer product. A preferred example of such a dimer acid is a product known as Empol 1008 Dimer acid, manufactured by the Emery Division of Henkel Corporation of Cincinnati, Ohio. Fatty acids having from 10 to 22 carbon atoms are preferably employed in the formation of the dimer acid based tetra-amide. The preferred dimer acid based tetra-amide is produced by Union Camp and comprises the reaction product of ethylene diamine, dimer acid, and stearic acids. For the purposes of this invention, the most preferred dimer acid base tetra-amide is the reaction product of dimer acid, ethylene diamine and stearic acid in a stoichiometric ratio of 1:2:2. Stearic acid is the preferred reactant because its adduct with dimer acid and ethylene diamine has the lowest viscosity of the dimer acid based tetra-amides. Its ingredients are also the most readily available and therefore cost the least.

The fatty amide containing material can also comprise a mono-amide. In fact, in the preferred case, the phase change ink carrier composition comprises both a tetra-amide compound and a mono-amide compound. The mono-amide compound typically comprises either a primary or secondary mono-amide, but is preferably a secondary mono-amide. Of the primary mono-amides, stearamide, such as Kemamide S, manufactured by Witco Chemical Company, can be employed herein. As for the secondary mono-amides, behenyl behenamide (Kemamide EX-666) and stearyl stearamide (Kemamide S-180 and Kemamide EX-672), all manufactured by Witco Chemical Company, are extremely useful mono-amides. However, stearyl stearamide is the mono-amide of choice in producing the phase change ink carrier composition of the present invention.

Another way of describing the preferred secondary mono-amide of this invention is by a structural formula. More specifically, the secondary mono-amide compound comprised as a composition which is represented by the structural formula:

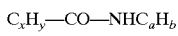

wherein:

x is an integer from 5 to 21 (maintaining C with 4 bonds)

y is a integer from 11 to 43 a is an integer from 6 to 22 (maintaining C with 4 bonds)

b is an integer from 13 to 45

The preferred fatty amide containing compounds of this invention comprise a plurality of fatty amide materials which are compatible with each other. Typically, even when a plurality of fatty amide containing compounds are employed to produce a phase change ink carrier composition, the carrier composition has a substantially single melting point transition. The melting point of the phase change ink composition is preferably at least about 70° C., more preferably at least about 80° C. and most preferably at least about 92° C.

The preferred phase change ink carrier composition comprises a tetra-amide and a mono-amide. The weight ratio of the tetra-amide to the mono-amide in the preferred instance is from about 2:1 to 1:10 and more preferably from about 1:1 to 1:3.

In order to add adhesion to the phase change ink carrier composition, a tackifier can be employed. The preferred tackifiers are those which are compatible with fatty amide containing materials. These include, for example, KE-100 Resin, a glycerol ester of hydrogenated abietic (rosin) acid made by Arakawa Chemical Industries. Floral 85, a glycerol ester of hydrogenated abietic (rosin) acid and Floral 105, a pentaerythritol ester of hydroabietic (rosin) acid, both manufactured by Hercules Chemical Company, Nevtac 100 and Nevtac 80, synthetic polyterpene resins manufactured by Neville Chemical Company and Wingtac 86, a modified polyterpene manufactured by Goodyear Chemical Company are also suitable tackifiers. However, Arakawa KE-100 resin is the tackifier of choice in producing phase change ink carrier compositions of the present invention.

Other materials may be added to the phase change ink carrier composition. In a typical phase change ink chemical composition, antioxidants are added for preventing discoloration of the carrier composition. The preferred antioxidant materials include Irganox 1010 manufactured by Ciba-Geigy; and Naugard 76, Naugard 445, Naugard 512, and Naugard 524 manufactured by Uniroyal Chemical Company; the most preferred antioxidant being Naugard 445.

Another compound which can be added in forming the phase change ink carrier composition which can be added in forming the phase change ink carrier composition is a plasticizer that is incorporated into the carrier composition to increase its flexibility and lower its melt viscosity. Plasticizers that have been found to be appropriate include dioctyl phthalate, diundecyl phthalate, alkylbenzyl phthalate (Santicizer 278), and triphenyl phosphate, all manufactured by Monsanto Chemical Company, tributoxyethyl phosphate (KP-140), manufactured by MC Corporation, dicyclohexyl phthalate (Morflex 150) manufactured by Morflex Chemical Inc., and trioctyl trimellitate, manufactured by Kodak.

In a preferred case, the phase change ink composition comprises a tetra-amide and a mono-amide compound, a tackifier, a plasticizer and an antioxidant. The preferred compositional ranges of this ink carrier composition are as follows: From about 10 to about 50 weight percent of a tetra-amide compound, from about 30 to about 80 weight percent of a mono-amide compound, from about 0 to about 40 weight percent of a tackifier, from about 0 to about 25 weight percent of a plasticizer, and from about 0 to about 2 percent antioxidant.

In employing the present invention, an isocyanate-based ink carrier composition or an isocyanate-derived ink, such as those disclosed in U.S. Pat. No. 5,780,528 issued Jul. 14, 1998, to the assignees of the present invention, could be used in place of or in combination with amide based carrier compositions disclosed herein. Where the inks are isocyanate-derived, they may employ a colored isocyanate-derived resin as either the sole colorant material or uncolored resin may be used in combination with conventional phase change ink colorant materials such as Color Index (C.I.) Solvent Dyes, Disperse Dyes, modified Acid and Direct Dyes, Basic Dyes, Sulphur Dyes or Vat Dyes and/or the polymeric dyes disclosed in U.S. Pat. No. 5,621,022 issued Apr. 15, 1997 to the assignee of the present invention, and/or pigments.

The term "colored isocyanate-derived resin" as used in the present specification and claims is defined as any monomeric, oligomeric or non-polymeric resinous material derived from the reaction of mono-, di-, or poly-isocyanates with a suitable nucleophilic molecule containing a chromogen, the mixture of a monofunctional alcohol and a suitable nucleophilic molecule containing a chromogen, the mixture of a monofunctional amine and a suitable nucleophilic molecule containing a chromogen, or the mixture of a monofunctional alcohol, a monofunctional amine and a suitable nucleophilic molecule containing a chromogen.

Preferred alcohols to react with difunctional and higher isocyanates to make the isocyanate-derived resins of this invention include any monohydric alcohol. For instance, the monohydric alcohol could be any aliphatic alcohol [e.g., a $C_1$–$C_{22}$ or higher linear alcohol, any branched alcohol or any cyclic aliphatic alcohol such as methanol, ethanol, (n- and iso)-propanol, (n-, iso-, t-) butanol, (n-, iso-, t-, and the like) pentanol, (n-, iso-, t-, and the like) hexanol, (n-, iso-, t-, and the like) octanol, (n-, iso-, t-, and the like) nonanol, (n- and branched) decanols, (n- and branched) undecanols, (n- and branched) dodecanols, (n- and branched) hexadecanols, (n- and branched) octadecanols, 3-cyclohexyl-1-propanol, 2-cyclohexyl-1-ethanol, cyclohexylmethanol, cyclohexanol, 4-methyl cyclohexanol, 4-ethylcyclohexanol, 4-t-butylcyclohexanol and the like]; an aliphatic/aromatic alcohol [e.g., benzyl alcohol, octyl, nonyl, and dodecylphenol alkoxylates of octyl, nonyl, and dodecylphenol, and alkoxyphenol]; aromatic alcohols such as phenol, naphthol, and the like, and their derivatives; fused ring alcohols (e.g., rosin alcohols, hydroabietyl alcohol, cholesterol, vitamin E, and the like) and other suitable alcohols (e.g., N,N-dimethyl-N-ethanolamine, stearamide-monoethanolamine, tripropyleneglycol monomethylether, hydroxybutanone, menthol, isoborneol, terpineol, 12-hydroxy stearyl stearamide, and the like). It will be obvious to those skilled in the art that small amounts (on a molar basis) of polyols could also be incorporated into the reaction mixture to produce oligomeric species in the resins if so desired. The preferred alcohols are hydroabietyl alcohol, octylphenol ethoxylate and octadecyl alcohol.

Preferred alcohols to react with monofunctional isocyanates to make the isocyanate-derived resins of this invention include any monohydric alcohol. For instance, the monohydric alcohol could be any aliphatic alcohol [e.g., a $C_1$–$C_{22}$ or higher linear alcohol, any branched alcohol or any cyclic aliphatic alcohol such as methanol, ethanol, (n- and iso-) propanol, (n-, iso-, and t-) butanol, (n-, iso-, t-, and the like) pentanol, (n-, iso-, t-, and the like) hexanol, (n-, iso-, t-, and the like) octanol, (n-, iso-, t-, and the like) nonanol, (n- and branched) decanols, (n- and branched) undecanols, (n- and branched) dodecanols, (n- and branched) hexadecanols, (n- and branched) octadecanols, 3-cyclohexyl-1-propanol, 2-cyclohexyl-1-ethanol, cyclohexylmethanol, cyclohexanol, 4-methyl cyclohexanol, 4-ethylcyclohexanol, 4-t-butylcyclohexanol, and the like]; an aliphatic/aromatic alcohol (e.g., benzyl alcohol, octyl, nonyl, and dodecylphenol alkoxylates or octyl, nonyl, and dodecylphenol, alkoxyphenol); aromatic alcohols such as phenol, naphthol, and the like, and their derivatives; fused ring alcohols (e.g., rosin alcohols, hydroabietyl alcohol, cholesterol, vitamin E, and the like) and other suitable alcohols (e.g., N,N-dimethyl-N-ethanolamine, stearamide-monoethanolamine, tripropyleneglycol monomethylether, hydroxybutanone, menthol, isoborneol, terpineol, 12-hydroxy stearyl stearamide, and the like), as well as multifunctional alcohols such as ethylene glycol, diethylene glycol, triethylene glycol, dimethylolpropionic acid, sucrose, polytetramethylene glycol (MW<~3000), polypropylene glycol (MW<~3000), polyester polyols (MW<~3000), polyethylene glycol (MW<~3000), pentaerythritol, triethanol amine, glycerin, 1,6-hexanediol, N-methyl-N,N-diethanol amine, trimethylol propane, N,N,N',N'-tetrakis(2-hydroxypropyl) ethylenediamine, and the like. The preferred alcohol is octadecanol.

Preferred amines to react with monofunctional isocyanates to make the isocyanate-derived resins of this invention include any monofunctional amine, with the exception of tertiary amines void of other nucleophilic functional groups (e.g., triethylamine). For instance, the monoamine could be any aliphatic primary or secondary amine [e.g., a $C_1$–$C_{22}$ or higher linear amine, any branched amine or any cyclic aliphatic amine such as methyl amine, ethyl amine, (n- and iso-)propyl amine, (n-, iso-, and t-) butyl amine, (n-, iso-, t-, and the like) pentyl amine, (n-, iso-, t-, and the like) hexyl amine, (n-, iso-, t-, and the like) octyl amine, (n-, iso-, t-, and the like) nonyl amine, (n- and branched) decyl amine, (n- and branched) undecyl amine, (n- and branched) octadecyl amine, (n- and branched) hexadecyl amine, (n- and branched) dodecyl amine, dimethyl amine, diethyl amine, di(n-, and iso-)propyl amine, di(n-, iso-, t-)butyl amine, di(n-, iso-, t-, and the like)pentyl amine, di(n-, iso-, t-, and the like)hexyl amine, di(n-, iso-, t-, and the like)cyclohexyl amine, di(n-, iso-, t-, and the like)heptyl amine, di(n-, iso-, t-, and the like)octyl amine, di(n-, iso-, t-, and the like)decyl amine, di(n-, iso-, t-, and the like)octadecyl amine, di(n-, iso-, t-, and the like)dodecyl amine, cyclohexyl amine, 2,3-dimethyl-1-cyclohexylamine, piperidine, pyrrolidine, and the like]; any aliphatic/aromatic amines (e.g., benzyl amine or analogues with longer or additional alkyl chains); aromatic amines such as aniline, anisidine, and the like; fused ring amines such as rosin amine, dehydroabietyl amine, dihydroabietyl amine, hydroabietyl amine, and the like; and miscellaneous amines (e.g., adamantyl amine; isonipecotamide; polyoxyalkylenemono-, di-, or triamines, such as M-, D-, and T-series Jeffamines available commercially from Huntsman Chemical Company of Austin, Tex.; 3,3'-diamino-N-methyl-dipropylamine, and the like; as well as multifunctional amines such as polyethylene imine; ethylene diamine; hexamethylene diamine; isomers of cyclohexyldiamines; 1,3-pentadiamine; 1,12-dodecanediamine; 3-dimethylaminopropylamine; 4,7,10-trioxa-1,13-tridecanediamine; diethylene triamine; 3,3-diamino-N-methyldipropylamine; tris(2-aminoethyl)amine, and the like.) The preferred amine is octadecylamine.

Preferred amines to react with difunctional and higher isocyanates to make the isocyanate-derived resins of this invention include any monofunctional amine, with the exception of tertiary amines void of other nucleophilic functional groups (e.g., triethylamine). For instance, the monoamine could be any aliphatic primary or secondary amine (e.g., a $C_1$–$C_{22}$ or higher linear amine, any branched amine or any cyclic aliphatic amine) such as methyl amine, ethyl amine, (n- and iso-)propyl amine, (n-, iso-, and t-) butyl amine, (n-, iso-, t-, and the like) pentyl amine, (n-, iso-, t-, and the like) hexyl amine, (n-, iso-, t-, and the like) octyl amine, (n-, iso-, t-, and the like) nonyl amine, (n- and branched) decyl amine, (n- and branched) undecyl amines, (n- and branched) dodecyl amines, (n- and branched) hexadecyl amines, (n- and branched) dodecyl amines, dimethyl amine, diethyl amine, di(n- and iso-)propyl amines, di(n-, iso-, t-)butyl amine, di(n-, iso-, t-, and the like)pentyl amine, di(n-, iso-, t-, and the like)hexyl amine, di(n-, iso-, t-, and the like)cyclohexyl amine, di(n-, iso-, t-, and the like)heptyl amine, di(n-, iso-, t-, and the like)octyl amine, di(n-, iso-, t-, and the like)decyl amine, di(n-, iso-, t-, and the like)dodecyl amine, di(n-, iso-, t-, and the like)octadecyl amine, cyclohexyl amine, 2,3-dimethyl-1-cyclohexylamine, piperidine, pyrrolidine, and the like; an aliphatic/aromatic amine (e.g., benzyl amine or analogues with longer or additional alkyl chains); aromatic amines such as aniline, anisidine, and the like; fused ring amines such as rosin amine, dehydroabietyl amine, dihydroabietyl amine, hydroabietyl amine, and the like; and miscellaneous amines (e.g., adamantyl amine; isonipecotamide; polyoxyalkylenemonoamines, such as M-series Jeffamines available commercially from Huntsman Chemical Company of Austin, Tex.; 3,3'-diamino-N-methyldipropylamine; and the like.) It will be obvious to those skilled in the art that small amounts (on a molar basis) of polyamines could also be incorporated into the reaction mixture to produce oligomeric species in the resins if so desired. The preferred amine is octadecyl amine.

Additionally, hydroxy/amino containing compounds can be employed (with di- and higher functionality isocyanates taking advantage of the difference in reactivity of the amine over the hydroxyl group, or with monoisocyanates reacting with the amine preferentially or with both the amine and the hydroxyl groups). Examples of this include ethanolamine, diethanolamine, and the like.

Additionally amides or other nucleophile containing compounds can be reacted with the isocyanates (mono, di and the like). Some examples include: urea, oleamide, stearamide, and the like.

Preferred precursors to the isocyanate-derived resins of the present invention include mono-, di- and other polyisocyanates. Examples of monoisocyanates include octadecylisocyanate; octylisocyanate; butyl and t-butylisocyanate; cyclohexyl isocyanate; adamantyl isocyanate; ethylisocyanatoacetate; ethoxycarbonylisocyanate; phenylisocyanate; alphamethylbenzyl isocyanate; 2-phenylcyclopropyl isocyanate; benzylisocyanate; 2-ethylphenylisocyanate; benzoylisocyanate; meta and para-tolylisocyanate; 2-, 3-, or 4-nitrophenylisocyanates; 2-ethoxyphenyl isocyanate; 3-methoxyphenyl isocyanate; 4-methoxyphenylisocyanate; ethyl 4-isocyanatobenzoate; 2,6-dimethylphenylisocyante; 1-naphthylisocyanate; (naphthyl)ethylisocyantes; and the like. Examples of diisocyanates include isophorone diisocyanate (IPDI); toluene diisocyanate (TDI); diphenylmethane 4,4'-diisocyanate (MDI); hydrogenated diphenylmethane-4,4'-diisocyanate ($H_{12}$MDI); tetra-methyl xylene diisocyanate (TMXDI); hexamethylene-1,6-diisocyanate (HDI); hexamethylene-1,6-diisocyanate; napthylene-1,5-diisocyanate; 3,3'-dimethoxy-4,4'-biphenyldiisocyanate; 3,3'-dimethyl-4,4'-bimethyl-4,4'-biphenyldiisocyanate; phenylene diisocyanate; 4,4'-biphenyldiisocyanate; trimethylhexamethylene diisocyanate; tetramethylene xylene diisocyanate; 4,4'-methylenebis(2,6-diethylphenyl isocyanate); 1,12-diisocyanatododecane; 1,5-diisocyanato-2-methylpentane; 1,4-diisocyanatobutane; and cyclohexylene diisocyanate and its isomers; uretidione dimers of HDI; and the like. Examples of triisocyanates or their equivalents include the trimethylolpropane trimer of TDI, and the like, isocyanurate trimers of TDI, HDI, IPDI, and the like, and biuret trimers of TDI, HDI, IPDI, and the like. Examples of higher isocyanate functionalities include copolymers of TDI/HDI, and the like, as well as MDI oligomers.

Any suitable reaction condition for making urethane or urea compounds by condensing alcohols and/or amines with isocyanates may be employed. Preferably, the reaction is carried out at elevated temperatures (e.g. about 60° C. to 160° C.) in the presence of a urethane reaction catalyst such as dibutyltindilaurate, bismuth tris-neodecanoate, cobalt benzoate, lithium acetate, stannous octoate or triethylamine. The reaction conditions preferably are conducted in an inert atmosphere, such as argon or nitrogen gas or other suitable atmosphere, to prevent oxidizing or yellowing the reaction products and to prevent undesirable side reactions. The mole ratio of reactants is adjusted so that the isocyanate functionalities are completely consumed in the reaction with a slight molar excess of alcohol or amine remaining. Conceptually the reactants can be added together in any order and/or added to the reaction as physical mixtures. However, in the preferred embodiments of the invention, reaction conditions and the order of the addition of reactants are carefully controlled for several reasons. First, reaction conditions and reactant additions are chosen to provide a controlled exothermic reaction. Secondly, when reacting mixtures of alcohols and/or amines with diisocyanates such as isophorone diisocyanate (IPDI), the order of addition of the different nucleophiles to the reaction is chosen to tailor the distribution of di-urethane molecules, and/or mixed urethane/urea molecules, and/or diurea molecules in the final resin. When doing this, the different reactivities to isocyanates of alcohols versus amines are employed, as are the reactivities of the two separate isocyanate groups on IPDI. See J. H. Saunders and K. C. Frisch's "Polyurethanes Part I, Chemistry" published by Interscience of New York, N.Y. in 1962 and Olin Chemicals' Luxate® IM isophorone diisocyanate technical product information sheet which provide a further explanation of this chemistry. Finally, when using chromogen-containing nucleophilic molecules that have more than one nucleophile per molecule, the order of addition of the nucleophile to the reaction mixture is chosen so as to minimize the number of oligomeric species in the final resin. This is done to minimize the final viscosity of the resin. The products of this reaction are colored, generally transparent solids having melting points in the range of about 20° C. to about 150° C. and viscosities in the range of about 10 cPs to about 2000 cPs at 150° C. and $T_g$'s of about –30° C. to about 100° C.

The preferred chromogen-containing nucleophilic molecules include dyes such as those disclosed in U.S. Pat. Nos. 3,994,835 and 4,132,840, assigned to Bayer, and U.S. Pat. Nos. 4,284,729; 4,507,407; 4,751,254; 4,846,846; 4,912,203; 5,270,363 and 5,290,921 assigned to Milliken Research Corporation. Also suitable may be any Color Index (C.I.) Solvent Dyes, Disperse Dyes, modified Acid and Direct Dyes, Basic Dyes, Sulphur Dyes or Vat Dyes that contain an alcohol, amine, or other nucleophilic functional group that is capable of reacting with an isocyanate. The more preferred chromogen-containing nucleophilic molecules contain at least one alcohol functional group. Most preferably this alcohol functional group is terminal to an alkylene oxide polymeric chain, arising from butylene oxide, styrene oxide, ethylene oxide, propylene oxide, or an ethylene/propylene oxide.

As previously indicated, the subject phase change composition exhibits excellent physical properties, for example specific conductance and color.

The specific conductance for each of the phase change inks used in this invention was evaluated using a commercially available conductance meter, the Rosemount Analytical Solu Comp Ultrapure Water Analyzer or conductivity meter, model SCL-C-005M6, fitted with a 0.01 $cm^{-1}$ cell constant probe. The ink to be measured was melted in a 100 ml glass beaker in a 115° C. oven. After the ink was fully liquid, the probe was lowered through an access hole in the top of the oven and positioned in the beaker of ink. The probe was left in the beaker not less than 1 ½ hours to allow for complete thermal equilibration. The probe and meter pair was calibrated using 1% precision resistors.

The reflectance spectrum for each of the phase change inks used in this invention was evaluated on a commercially available spectrophotometer, the ACS SpectroSensor II in accordance with the measuring methods stipulated in ASTM E805 (Standard Practice of Instrumental Methods of Color or Color Difference Measurements of Materials) using the appropriate calibration standards supplied by the manufacturer. For the purposes of verifying and quantifying the overall colorimetric performance of this invention, measurement data were reduced via tristimulus integration, following ASTM E308 (Standard Method for Computing the Colors of Objects using the CIE System) in order to calculate the 1976 CIE L* (lightness), a* (redness-greeness) and b* (yellowness-blueness) values for each phase change ink sample.

The present invention is further described in detail by the following Examples and comparisons. All parts and percentages are by weight and all temperatures are degrees Celsius unless explicitly stated otherwise. It is to be understood that although the following examples may recite only one particular colored isocyanate-derived resin, the example is only illustrative and the invention could be utilized in any of the primary colorants (cyan, magenta, black and yellow) used in subtractive color printing.

EXAMPLE 1

This example demonstrates a method of producing a preferred phase change ink composition for the purpose of ensuring the reliability of an electronic level sensing system by combining a quaternary ammonium salt with a preferred phase change ink carrier.

Method A: In a typical preparation, 600 grams of phase change ink composition was melted at 110° C. When the melting was complete about 60mg (0.010 weight percent) quaternary ammonium salt was added to the molten ink carrier composition. The mixture was stirred at 110° C. for 30 minutes and then filtered.

If the end use for the preferred phase change ink was to encode ink type by virtue of specific conductance differences the following method was used.

Method B: In a typical preparation, about 600 grams of phase change ink composition was melted at 110° C. When the melting was complete 12 grams (2 weight percent) of quaternary ammonium salt was added and the mixture was stirred at 110° C. After 30 minutes the mixture was filtered.

EXAMPLE 2

This example demonstrates the two levels of specific conductances available through the Methods A & B of the preceding example. To meet the need to supplement the native specific conductance of a phase change ink carrier composition, and thus ensure proper level sensing, only a very low (0.005–0.030 weight percent) concentration of quaternary ammonium salt is needed. At these levels the increment of specific conductance increase is a linear function of the weight percent of quaternary ammonium salt added. For the most preferred phase change ink the increment of specific conductance increase, $\Delta C$, as a function of weight percent of the tetrabutylammonium tetrafluorborate quaternary ammonium salt added is:

$$\Delta C(\mu S/cm) = (14.95 \times 10^{-6}) \times (\text{weight percent salt added})$$

To meet the need to encode ink type into the phase change ink carrier composition, a much higher concentration of quaternary ammonium salt is needed. When the phase change ink carrier is prepared as per Method B in Example 1, the dissolution of the specific conductance augmenting additive, the quaternary ammonium salt, is saturated. Although lesser concentrations are possible; the choice of a saturated solution allows the most range to decoding devices, as shown in Table A:

TABLE A

| Phase Change Ink | Specific Conductance Low Concentration | Specific Conductance 2% Concentration |
|---|---|---|
| Yellow | 0.295 μS/cm | 15.5 μS/cm |
| Magenta | 1.02 μS/cm | 20.4 μS/cm |
| Cyan | 1.81 μS/cm | 17.9 μS/cm |

EXAMPLE 3

This example demonstrates that the important physical property of phase change ink, that is, its vibrant colors are not degraded by the addition of an effective amount of the specific conductance augmenting additive. The reflectance spectra test data are summarized in Table B:

TABLE B

| Phase Change Carrier Ink | L* | a* | b* | ΔE* |
|---|---|---|---|---|
| Yellow (undoped) | 87.13 | −6.93 | 88.35 | 91.19 |
| Yellow (0.0145% doped) | 88 | −8.6 | 84 | 86 |
| Yellow (2% doped) | 87.27 | −6.9 | 88.55 | 91.37 |
| Magenta (undoped) | 48.50 | 71.68 | −22.20 | 87.26 |
| Magenta (2% doped) | 51.68 | 73.75 | −21.75 | 87.22 |
| Cyan (undoped) | 50.97 | −19.69 | −44.12 | 64.42 |
| Cyan (2% doped) | 50.99 | −18.22 | −45.21 | 64.67 |
| Reference | 95.32 | 0.83 | −2.14 | — |

Measurement conditions were: Illuminant C, 2 degree observer, small area view, specular included, wavelength interval 10 nm.

EXAMPLE 4

About 100 grams of the molten ink from Example 37 of U.S. patent application Ser. No. 09/023,851 filed Feb. 13, 1998 and assigned to the assignee of the present invention were stirred at 130° C. and the conductivity of the ink was measured using a Rosemount Analytical solu Comp Ultrapure Water Analyzer or conductivity meter, model SCL-C-005M6, fitted with a 0.01 $cm^{-1}$ cell constant probe. The conductivity of the undoped ink was found to be 0.02 μS/cm. To the molten ink was added approximately 2 grams of tetra n-butylammonium tetrafluoroborate. After stirring for approximately ½ hour at 130° C., the conductivity of the ink was found to be 0.361μS/cm. This demonstrates that a soluble salt added in an effective amount to an isocyanate-derived ink carrier composition will elevate the conductivity of the ink to a usefully detectable level when used in an ink level sensing system.

Where it is desired to encode a specific type of ink into the phase change ink carrier composition a higher effective amount of a quaternary ammonium salt is employed. This could be utilized to indicate specific colors or ink formulations which can be sensed by the printer. For example, the printer would activate an operator alert if magenta colored ink were accidently loaded into a cyan colored ink reservoir based on the encoded concentration peculiar for each color or the printer could activate a similar alert for application specific uses of different inks, such as to differentiate among different shades of black in a medical diagnostic imaging printer as described in co-pending U.S. application Ser. No. 08/916,588 filed Aug. 22, 1997 and assigned to the assignee of the present invention.

Having illustrated and described the principles of our invention in a preferred embodiment thereof it should be readily apparent to those skilled in the art that the invention can be modified in arrangement and detail without departing from such principles. We claim all modifications coming within the spirit and scope of the accompanying claims.

While the invention has been described above with references to specific embodiments thereof, it is apparent that many changes, modifications and variations in the materials, arrangements of parts and steps can be made without departing from the inventive concept disclosed herein. For example, it is to be understood that the invention can be practised in phase change inks that may be employed in digital electronic printing, such as desktop printing, and conventional commercial printing applications, such as gravure, offset, intaglio, flexographic and letterpress. It should be noted that the isocyanate-derived phase change materials can also be used in three dimensional modeling applications where they are ejected from a specialized dispensing device.

Accordingly, the spirit and broad scope of the appended claims is intended to embrace all such changes, modifications and variations that may occur to one of skill in the art upon a reading of the disclosure. All patent applications, patents and other publications cited herein are incorporated by reference in their entirety.

Having thus described the invention, what is claimed is:

1. A modified phase change carrier composition in combination with an additive, said phase change carrier composition comprising:
   (a) a urethane resin that is the reaction product of at least one alcohol and an isocyanate, the alcohol consisting of a straight chained monohydric aliphatic alcohol, a monohydric aromatic alkoxylated alcohol or a monohydric fused ring alcohol; and
   (b) an additive comprising a chemical compound in an effective amount which improves the reliability of electronic level sensing in a dispensing device.

2. The phase change carrier composition of claim 1 wherein said additive increases the specific conductance of the composition.

3. The phase change carrier composition of claim 1 wherein said additive comprises at least one nitrogen containing compound.

4. The phase change carrier composition of claim 1 wherein the additive comprises a quaternary ammonium salt or a blend of quaternary ammonium salts.

5. The phase change carrier composition of claim 1 wherein the additive is a $R_1$—, $R_2$—, $R_3$—, $R_4$— ammonium salt, said $R_1$—, $R_2$—, $R_3$—, $R_4$— substituents being selected from the group consisting of primary alkyl groups, secondary alkyl groups, tertiary alkyl groups, alkyleneoxy groups, benzyl groups, phenyl groups and mixtures thereof.

6. The phase change carrier composition of claim 1 wherein the additive is a quaternary ammonium compound where the gegen ion is selected from the group consisting of a chloride, a bromide, a fluoride, an iodide, a hydroxide, a tribromide, a tetrafluoroborate, a perchlorate, a phosphate, a carboxylate, a nitrate, a benzoate, toluene sulfonate, trifluoromethyl sulfate, methyl sulfate, sulfate and mixtures thereof.

7. A modified phase change carrier composition in combination with an additivie, said phase change carrier composition comprising:
   (a) a urethane resin that is the reaction product of at least one alcohol and an isocyanate, the alcohol consisting of a straight chained monohydric aliphatic alcohol, a monohydric aromatic alkoxylated alcohol or a monohydric fused ring alcohol; and
   (b) an additive having a chemical compound in an effective amount which improves the reliability of electronic level sensing in a dispensing device, the additive being selected from the group consisting of tetrabutylammonium tetrafluoroborate, tetradecyltrimethylammonium bromide, benzyltrimethylammonium chloride and mixtures thereof.

8. A modified phase change carrier composition in combination with an additivie, said phase change carrier composition comprising:
   (a) a urethane resin that is the reaction product of at least one alcohol and an isocyanate, the alcohol consisting of a straight chained monohydric aliphatic alcohol, a monohydric aromatic alkoxylated alcohol or a monohydric fused ring alcohol;
   (b) an additive having a chemical compound in an effective amount which improves the reliability of electronic level sensing in a dispensing device; and
   (c) a mono-amide, the composition being used in an ink for printing.

9. The phase change carrier composition of claim 8 further comprising at least one polyethylene wax.

10. The phase change carrier composition of claim 8 further comprising at least one chromogen.

11. The phase change carrier composition of claim 2 further comprising at least one chromogen containing nucleophile.

12. A modified phase change carrier composition in combination with an additive, the phase change carrier composition comprising:
   (a) a urethane/urea resin that is the reaction product of at least one alcohol, at least one amine, and an isocyanate, the alcohol consisting of a straight chained monohydric aliphatic alcohol, a monohydric aromatic alkoxylated alcohol, a monohydric fused ring alcohol; and
   (b) an additive comprising a chemical compound in an effective amount which improves the reliability of electronic level sensing in a dispensing device.

13. The phase change carrier composition of claim 12 wherein said additive increases the specific conductance of the composition.

14. The phase change ink carrier composition of claim 12 wherein said additive comprises at least one nitrogen containing compound.

15. The phase change ink carrier composition of claim 12 wherein the additive comprises a quaternary ammonium salt or a blend of quaternary ammonium salts.

16. The phase change carrier composition of claim 12 wherein the additive is a $R_1$—, $R_2$—, $R_3$—, $R_4$— ammonium salt, said $R_1$—, $R_2$—, $R_3$—, $R_4$— substituents being selected from the group consisting of primary alkyl groups, secondary alkyl groups, tertiary alkyl groups, alkyleneoxy groups, benzyl groups, phenyl groups and mixtures thereof.

17. The phase change carrier composition of claim 12 wherein the additive is a quaternary ammonium compound where the gegen ion is selected from the group consisting of a chloride, a bromide, a fluoride, an iodide, a hydroxide, a tribromide, a tetrafluoroborate, a perchlorate, a phosphate, a carboxylate, a nitrate, toluene sulfonate, trifluoromethyl sulfate, methyl sulfate, sulfate and mixtures thereof.

18. The phase change carrier composition of claim 15 wherein the additive is selected from the group consisting of tetrabutylammonium tetrafluoroborate, tetradecyltrimethylammonium bromide, benzyltrimethylammonium chloride and mixtures thereof.

19. The phase change carrier composition of claim 17 further comprising a mono-amide, the composition being used in an ink for printing.

20. The phase change carrier composition of claim 19 further comprising at least one polyethylene wax.

21. The phase change carrier composition of claim 19 further comprising at least one chromogen to form an ink.

22. The phase change carrier composition of claim 12 further comprising at least one chromogen containing nucleophile.

23. A phase change carrier composition having a phase change carrier in combination with an additive comprising in combination:

(a) a urea resin that is the reaction product of at least one amine and an isocyanate; and (b) an additive comprising a chemical compound in an effective amount which improves the reliability of electronic level sensing in a dispensing device.

24. The phase change carrier composition of claim 23 wherein the additive increases the specific conductance of the composition.

25. The phase change carrier composition of claim 23 wherein the additive comprises at least one nitrogen containing compound.

26. The phase change carrier composition of claim 23 wherein the additive comprises a quaternary ammonium salt or a blend of quaternary ammonium salts.

27. The phase change carrier composition of claim 23 wherein the additive is a $R_1$—, $R_2$—, $R_3$—, $R_4$— ammonium salt, said $R_1$—, $R_2$—, $R_3$—, $R_4$— substituents being selected from the group consisting of primary alkyl groups, secondary alkyl groups, tertiary alkyl groups, alkyleneoxy groups, benzyl groups, phenyl groups and mixtures thereof.

28. The phase change carrier composition of claim 23 wherein the additive is a quaternary ammonium compound where the gegen ion is selected from the group consisting of a chloride, a bromide, a fluoride, an iodide, a hydroxide, a tribromide, a tetrafluoroborate, a perchlorate, a phosphate, a carboxylate, a nitrate, a benzoate, toluene sulfonate, trifluoromethyl sulfate, methyl sulfate, sulfate and mixtures thereof.

29. The phase change carrier composition of claim 26 wherein the additive is selected from the group consisting of tetrabutylammonium tetrafluoroborate, tetradecyltrimethylammonium bromide, benzyltrimethylammonium chloride and mixtures thereof.

30. The phase change carrier composition of claim 28 further comprising a mono-amide, the composition being used in an ink for printing.

31. The phase change carrier composition of claim 27 further comprising at least one polyethylene wax.

32. The phase change carrier composition of claim 30 further comprising at least one chromogen to form an ink.

33. The phase change carrier composition of claim 23 further comprising at least one chromogen containing nucleophile.

34. A modified phase change ink composition in combination with an additive, said phase change ink composition comprising:

(a) a urethane resin that is the reaction product of at least one alcohol, and an isocyanate, the alcohol consisting of a straight chained monohydric aliphatic alcohol, a monohydric aromatic alkoxylated alcohol, or a monohydric fused ring alcohol; and a urethane/urea resin that is the reaction product of at least one alcohol, at least one amine and an isocyanate;

(c) a mono-amide;

(d) a colorant; and (d) an additive comprising a chemical compound in an effective amount which improves the reliability of electronic ink level sensing in a dispensing device.

35. The phase change ink carrier composition of claim 34 wherein said additive increases the specific conductance of the ink.

36. The phase change ink carrier composition of claim 34 wherein said additive comprises at least one nitrogen containing compound.

37. The phase change ink carrier composition of claim 34 wherein the additive comprises a quaternary ammonium salt or a blend of quaternary ammonium salts.

38. The phase change ink carrier composition of claim 34 wherein the additive is a $R_1$—, $R_2$—, $R_3$—, $R_4$— ammonium salt, said $R_1$—, $R_2$—, $R_3$—, $R_4$— substituents being selected from the group consisting of primary alkyl groups, secondary alkyl groups, tertiary alkyl groups, alkyleneoxy groups, benzyl groups, phenyl groups and mixtures thereof.

39. The phase change ink carrier composition of claim 34 wherein the additive is a quaternary ammonium compound where the gegen ion is selected from the group consisting of a chloride, a bromide, a fluoride, an iodide, a hydroxide, a tribromide, a tetrafluoroborate, a perchlorate, a phosphate, a carboxylate, a nitrate, a benzoate, toluene sulfonate, trifluoromethyl sulfate, methyl sulfate, sulfate and mixtures thereof.

40. The phase change ink carrier composition of claim 37 wherein the additive is selected from the group consisting of tetrabutylammonium tetrafluoroborate, tetradecyltrimethyl ammonium bromide, benzyltrimethylammonium chloride and mixtures thereof.

41. The phase change carrier composition of claim 8 wherein the additive is a quaternary ammonium compound where the gegen ion is selected from the group consisting of a chloride, a bromide, a fluoride, an iodide, a hydroxide, a tribromide, a tetrafluoroborate, a perchlorate, a phosphate, a carboxylate, a nitrate, a benzoate, toluene sulfonate, trifluoromethyl sulfate, methyl sulfate, sulfate and mixtures thereof.

\* \* \* \* \*